United States Patent [19]

Yasui

[11] Patent Number: 4,939,953

[45] Date of Patent: Jul. 10, 1990

[54] LIMITED SLIP DIFFERENTIAL

[75] Inventor: Yasuyoshi Yasui, Toyota, Japan

[73] Assignee: Toyota Jidosha Kabushiki Kaisha, Aichi, Japan

[21] Appl. No.: 281,328

[22] Filed: Dec. 8, 1988

[30] Foreign Application Priority Data

Dec. 8, 1987 [JP] Japan .................. 62-186844

[51] Int. Cl.$^5$ ............................................. F16H 1/44
[52] U.S. Cl. .................. 475/233; 74/459.5; 475/235; 475/241
[58] Field of Search ............ 74/713, 459.5, 710, 74/711, 462, 464, 466

[56] References Cited

U.S. PATENT DOCUMENTS

| | | | |
|---|---|---|---|
| 1,454,508 | 5/1923 | Eckert | 74/459.5 X |
| 2,153,372 | 4/1939 | Hyde | 192/85 |
| 2,183,285 | 12/1939 | Wildhaber | 74/459.5 |
| 2,506,756 | 5/1950 | Wildhaber | 74/459.5 |
| 3,752,280 | 8/1973 | Cheek | 192/85 AA |
| 3,817,117 | 6/1974 | Kita et al. | 74/462 |
| 3,831,462 | 8/1974 | Baremore | 74/711 |
| 3,851,540 | 12/1974 | Tutiya | 74/462 X |
| 3,894,446 | 7/1975 | Snoy et al. | 74/711 |
| 4,012,968 | 3/1977 | Kelbel | 74/711 |
| 4,163,400 | 8/1979 | Fisher et al. | 74/713 X |
| 4,207,777 | 6/1980 | Fluehmann | 74/462 |
| 4,445,400 | 5/1984 | Sullivan et al. | 74/711 |
| 4,594,913 | 6/1986 | Opitz | 74/711 |
| 4,653,340 | 3/1987 | LaBate | 74/462 |
| 4,727,966 | 3/1988 | Hiramatsu et al. | 74/711 X |
| 4,747,322 | 5/1988 | Orain | 74/715 |
| 4,821,604 | 4/1989 | Asano | 74/711 X |

FOREIGN PATENT DOCUMENTS

| | | | |
|---|---|---|---|
| 228697 | 7/1987 | European Pat. Off. | |
| 321639 | 10/1918 | Fed. Rep. of Germany | 74/466 |
| 2320340 | 11/1974 | Fed. Rep. of Germany | 74/462 |
| 61-41038 | 2/1986 | Japan | |
| 61-102329 | 5/1986 | Japan | |
| 140241 | 8/1986 | Japan | |
| 61-191434 | 8/1986 | Japan | |
| 62-251236 | 11/1987 | Japan | |
| 63-67431 | 3/1988 | Japan | |
| 63-291729 | 11/1988 | Japan | |
| 1060839 | 12/1983 | U.S.S.R. | 74/462 |
| 22001 | of 1907 | United Kingdom | 74/462 |
| 247685 | 2/1926 | United Kingdom | 74/462 |

*Primary Examiner*—Dwight Diehl
*Assistant Examiner*—Chris Campbell
*Attorney, Agent, or Firm*—Oliff & Berridge

[57] ABSTRACT

A limited slip differential includes four pinions formed of straight bevel gears and a pair of side gears formed of straight bevel gears. A pressure angle of a first surface of each of a plurality of teeth provided on each pinion is formed larger than that of a second surface thereof and pressure angles of third and fourth surfaces of each of a plurality of teeth provided on each side gear are respectively equal to the pressure angels of the first and second surfaces.

4 Claims, 2 Drawing Sheets

LIMITED SLIP DIFFERENTIAL

BACKGROUND OF THE INVENTION

1. Field of the Invention

This invention relates to a limited slip differential and, more particularly, to a limited slip differential suitable to be installed on a drive line of an automobile.

2. Description of the Prior Art

A conventional limited slip differential, in which a plurality of pinions consisting of straight bevel gears and a pair of side gears consisting of straight bevel gears meshing with these pinions are disposed in a differential case, has frictional force generating means which limits the differential motion produced between shafts coupled respectively with the side gears. In the limited slip differential, a multiple disc clutch is pressed with the axial thrust load produced in the side gears to obtain the frictional force. However, this frictional force has the same magnitude either at the time of driving and at the time of being driven such as engine braking. As a result, the differential limiting forces generated at driving and driven times are of the same magnitude.

It is an original object of a limited slip differential to effectively transmit power to drive wheels at the time of driving (driving forwards). From this point of view, a large differential limiting force is preferably generated at the time of driving while a small differential limiting force is preferably generated at the time of being driven. Particularly, in a vehicle incorporating an anti-lock brake system or like apparatus for preventing wheel lock at the time of braking, a difference in braking force between left and right wheels occurs when the large differential limiting force acts at the time of engine braking or braking operation. As a result, yawing moment is generated about a vertical axis extending through the center of gravity of the vehicle to deteriorate the braking stability.

Japanese Patent Public Disclosure (KOKAI) No. 61-41038 has disclosed a differential gear in which a pair of sun gears or side gears and a plurality of planetary gears or pinions meshing with the side gears respectively disposed in a differential case are constituted from spiral bevel gears having respective teeth twisted in the opposite direction. In this differential gear, the tooth surfaces on which the pinions mesh with left and right side gears are concave with respect to the side gear on one side and are convex with respect to the side gear on the other side. Accordingly, the axial thrust may be varied to enable enlargement of the differential limiting force at the time of driving.

SUMMARY OF THE INVENTION

An object of the present invention is to provide a limited slip differential which includes side gears and pinions constituted from straight bevel gears, whereby a large differential limiting force may be generated at the time of driving.

According to the present invention, there is provided a limited slip differential which comprises a differential case, a plurality of pinions consisting of straight bevel gears and disposed in the case, a pair of side gears consisting of straight bevel gears meshing with the pinions and disposed in the case, and a frictional force generating means which limits a differential motion generated between shafts coupled respectively with the side gears, wherein a pressure angle of a first surface of each of a plurality of teeth provided on the respective pinions is formed larger than that of a second surface thereof, pressure angles of third and fourth surfaces of each of a plurality of teeth provided on the respective side gears are respectively formed equal to those of the first and second surfaces, and wherein the pair of side gears are disposed such that the first surface of each pinion is in contact with the third surface of the side gear on one side while the second surface of each pinion is in contact with the fourth surface of the side gear on the other side when the pinions and side gears are rotated in one direction by the differential case.

When the pinions and side gears are rotated in one direction by the differential case, the second surface of each pinion meshes with the fourth surface of the right side gear if the first surface of each pinion meshes with the third surface of the left side gear. Since the meshing reaction generated on the tooth surface is proportional to the tangent of the pressure angle, the axial thrusts generated on the left and right side gears differ from each other.

The sizes of pressure angles of the first and second surfaces of the pinions and pressure angles of the third and fourth surfaces of the side gears are only varied to make the left and right axial thrusts different from each other. Thus, the differential limiting force may be enlarged at the time of driving without complicating the structure.

BRIEF DESCRIPTION OF THE DRAWINGS

The foregoing and other objects and features of the invention will become apparent from the following description of a preferred embodiment of the invention with reference to the accompanying drawings, in which.

DETAILED DESCRIPTION OF THE PREFERRED EMBODIMENT

Figure 1:
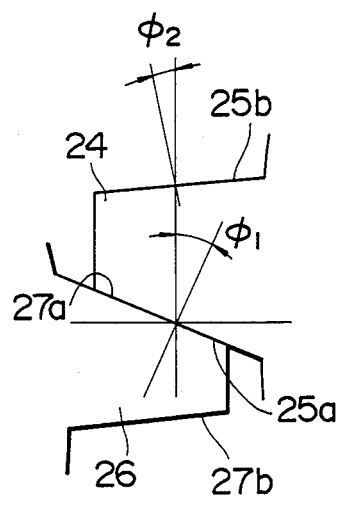
FIG. 1 is a schematic view showing a portion 1 in FIG. 3 and explains meshing surfaces between a pinion and a left side gear.

A limited slip differential 10 includes a differential case 12 consisting of two portions and connected with each other through bolts 11, a plurality of pinions 14 and a pair of side gears 16 respectively disposed in the differential case 12, whereby a differential motion generated between a shaft 18 coupled with one side gear 16 and a shaft 20 coupled with the other side gear 16 is limited by frictional force generating mean 22.

Figure 2:
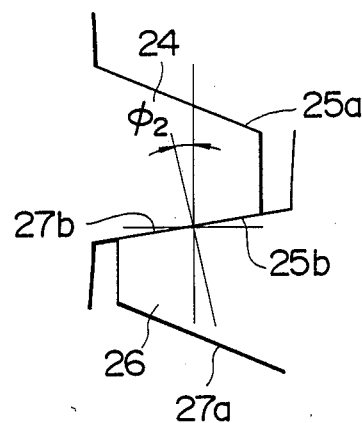
FIG. 2 is a schematic view showing a portion 2 in FIG. 3 and explains meshing surfaces between a pinion and a right side gear.
Figure 3:
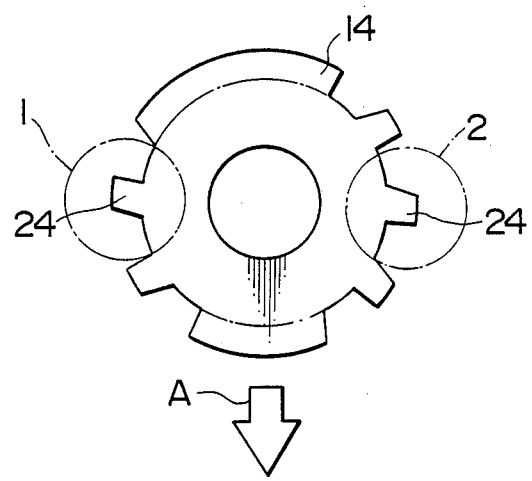
FIG. 3 is a plan view showing the pinion.
Figure 4:
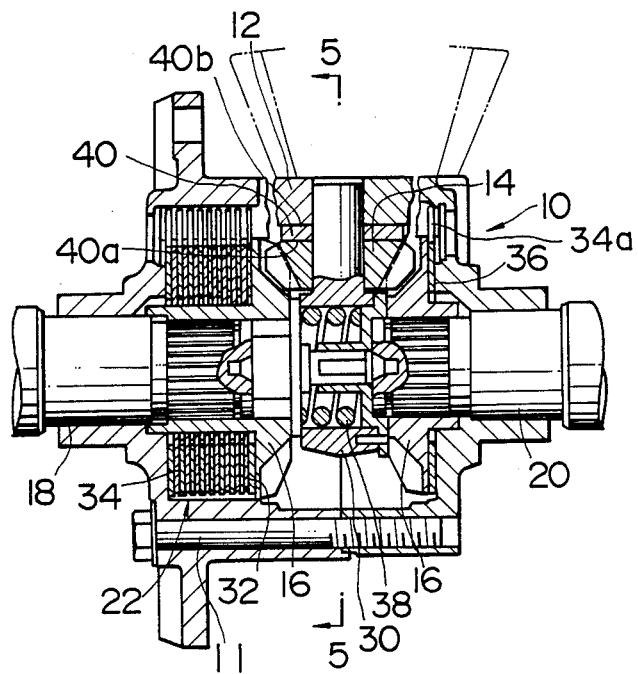
FIG. 4 is a sectional view taken along a line 4-O-4 in FIG. 5 of a limited slip differential.
Figure 5:
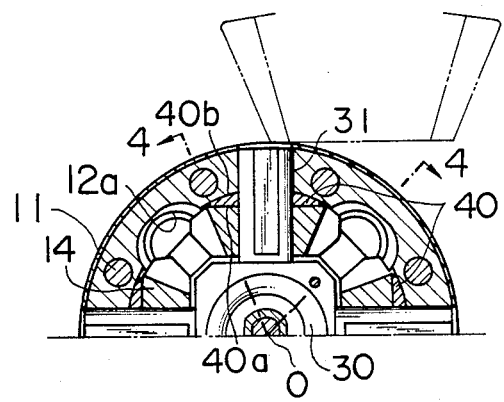
FIG. 5 is a partial sectional view taken along a line 5—5 in FIG. 4.

Both the plurality of pinions 14 and the pair of side gears 16 are formed of straight bevel gears. A plurality of teeth 24 provided on each pinion 14, as shown in FIGS. 1 through 3, are formed such that a pressure angle $\phi_1$ of a first surface 25a of each tooth 24 is larger than a pressure angle $\phi_2$ of a second surface 25b of each tooth 24. On the other hand, a plurality of teeth 26 provided on each side gear 16 are formed such that a pressure angle $\phi_1$ of a third surface 27a of each tooth 26 is equal to the pressure angle of the first surface 25a and a pressure angle $\phi_2$ of a fourth surface 27b of each tooth 26 is equal to the pressure angle of the second surface 25b.

The pair of side gears 16 are formed and arranged such that the first surface 25a of the tooth 24 of each pinion 14 is in contact with the third surface 27a of the tooth 26 of the side gear 16 on one side while the second surface 25b of the tooth 24 of each pinion 14 is in contact with the fourth surface 27b of the tooth 26 of the side gear 16 on the other side when the pinions 14 and side gears 16 are rotated in one direction by the differential case 12.

In the embodiment shown, when the pinions 14 are rotated in the direction of an arrow A in FIG. 3 at the time of forward driving, the first surface 25a of the tooth 24 of each pinion is in contact with the third surface 27a of the tooth 26 of the left side gear 16 while the second surface 25b of the tooth 24 of each pinion is in contact with the fourth surface 27b of the tooth 26 of the right side gear 16.

The plurality of pinions 14 (four pinions in the embodiment shown) are rotatably supported by spider shafts 31 disposed at intervals of 90° in the circumferential direction and extending orthogonally to the axes of the shafts 18, 20. The pair of side gears 16 engage unrotatably and axially movably the shafts 18, 20 respectively and mesh with the plurality of the pinions 14.

The frictional force generating means 22 is constituted from a plurality of clutch plates 32 disposed on the left side of the left side gear 16 and engaging unrotatably and axially movably an outer spline provided on the side gear 16, a plurality of thrust washers 34 disposed on the left side of the left side gear 16, each having a plurality of protrusions 34a which engage unrotatably and axially movably a plurality of recesses 12a provided in the differential case 12 and a thrust washer 36 disposed on the right side of the right side gear 16 and engaging unrotatably and axially movably the plurality of the recesses provided in the differential case 12. A coil spring 38 disposed in a spider 30 adds preload to the plates 32 and washers 34 through the left side gear 16 on one hand and to the washer 36 through the right side gear 16 on the other hand.

In the embodiment shown, since the number of frictional surfaces formed of the clutch plates 32 and thrust washers 34 disposed on the left side is larger than that of the frictional surfaces formed by the right thrust washer 36 on the right side, the differential limiting frictional force at the time of advance driving is far larger than that at the time of engine braking, as will be apparent from the subsequent description.

Since the tooth surfaces of the pinions 14 and left and right side gears 16 meshing with the pinions 14 differ in the pressure angles from each other, a large reaction acts on the pinion 14 from the side gear 16 in a meshing position having the large pressure angle, whereas a small reaction acts on the pinion 14 from the side gear 16 in a meshing position having the small pressure angle. By this difference between the reactions is generated such moment to cause the pinion 14 to rotate in a plane including the meshing points of the pinion 14 and left and right side gears 16 and axes of the side gears 16. Rotation preventing means 40 is preferably provided to cope with the moment.

The rotation preventing means 40 is disposed between each pinion 14 and the differential case 12. In the embodiment shown, a thrust washer is used as the rotation preventing means 40 having an inner surface 40a formed as a plane opposed to the pinion 14 and an outer surface 40b opposed to the differential case 12. The outer surface 40b is a curved convex surface having an arc centering around the axis of the shafts 18, 20 in a plane perpendicular to the axes. On the other hand, the surface of the pinion 14 opposed to the rotation preventing means 40 is formed as a plane and the surface of the differential case 12 opposed to the rotation preventing means 40 is a curved concave surface having an arc centering around the axes of the shafts 18, 20 in a plane perpendicular to the axes.

When the rotation preventing means 40 is disposed between the pinion 14 and the differential case 12, the inner surface 40a is in close contact with the opposed surface of the pinion 14 while the outer surface 40b is in close contact with the opposed surface of the differential case 12. As a result, when the rotating moment acts on the pinion 14, this moment is transmitted through the rotation preventing means 40 to the differential case 12 and then received by the differential case 12. Thus, it is possible to prevent the pinion 14 from being pinched to the spider shaft 31 or to prevent an edge load from acting on a portion where the spider shaft 31 is fitted in the differential case 12.

When the outer surface 40b of the rotation preventing means 40 is formed as a surface having an arc and the opposed surface of the differential case 12 is formed as a surface having an arc, the opposed surface of the differential case 12 may be manufactured as a portion of a through hole centering around the axes of the shafts 18, 20 to improve the work efficiency.

When the pressure angle $\phi_1$ is assumed to be 35°, pressure angle $\phi_2$ to be 10°, conical angle $\gamma$ of the side gear to be 58° and tangential load $W_o$ on the side gear to be 1000 kg, the axial thrust load $W_1$ acting on the side gear is given by the following formula;

$$W_1 = W_o \times \tan \phi \times \sin \gamma$$

Then, when substituting the numeral values for $W_o$, $\phi$ and $\gamma$ for calculation, the axial thrust load acting on the side gear in the position where the pressure angle $\phi_1$ is at 35° amounts to 593 kg while the axial thrust load acting on the side gear in the position where the pressure angle $\phi_2$ is at 10° amounts to 150 kg.

As is described in the embodiment as noted above, when the numbers of friction surfaces of the frictional force generating means differ in the left and right sides from each other, for example, the number of left friction surfaces is assumed to be 17 and that of right friction surfaces is assumed to be 1, and the differential limiting force is given by the product of the axial thrust and the number of friction surfaces, the differential limiting force results in 10231 kg at the time of forward driving while it results in 3143 kg at the time of reverse driving or being driven.

What is claimed is:
1. A limited slip differential comprising:
a differential case;
a plurality of pinions comprising straight bevel gears and disposed in the differential case, each pinion having a plurality of teeth, each of which includes a first surface and a second surface;
a pair of side gears comprising straight bevel gears meshing with the pinions and disposed in the differential case, each side gear having a plurality of teeth, each of which includes a third surface and a fourth surface; and frictional force generating means which limits a differential motion produced between shafts coupled respectively with the side gears, the generating means including a plurality of frictional plates, wherein a pressure angle of the first surface of each pinion tooth is formed larger than a pressure angle of the second surface thereof, pressure angles of the third and fourth surfaces of each side gear tooth being respectively formed equal to the pressure angles of said first and second surfaces of each pinion tooth, said pair of side gears being arranged at first and second sides of said pinions such that the first surface of each pinion tooth is contacted with third surfaces of the side gear teeth of the side gear at said first side while the second surface of each pinion tooth is contacted with fourth surfaces of the side gear teeth of the side gear at said second side when said pinions and side gears are rotated in one direction by said differential case, and said frictional force generating means being arranged such that the number of the frictional plates disposed respectively in a first position between the side gear at said first side and the differential case is different from the number of the frictional plates disposed respectively in a second position between the side gear at said second side and the differential case.

2. A limited slip differential as claimed in claim 1 wherein at a time of advance driving a large thrust load is generated on the side gear at said first side and a small thrust load is generated on the side gear at said second side, and the number of frictional plates in said first position is greater than the number of frictional plates in said second position.

3. A limited slip differential as claimed in claim 1, further comprising rotation preventing means disposed between each of said pinions and the differential case.

4. A limited slip differential as claimed in claim 3, wherein said rotation preventing means comprises a washer having a flat inner surface and an outer surface which is a convex curved surface having an arc centered about the axes of said shafts in a plane perpendicular to the axes, and wherein an inner surface of the differential case is formed to fit on the outer surface of the washer.

* * * * *